(12) United States Patent
Lu et al.

(10) Patent No.: US 11,734,889 B2
(45) Date of Patent: Aug. 22, 2023

(54) METHOD OF GAZE ESTIMATION WITH 3D FACE RECONSTRUCTING

(71) Applicant: Beihang University, Beijing (CN)

(72) Inventors: Feng Lu, Beijing (CN); Jiadong Liang, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 17/719,948

(22) Filed: Apr. 13, 2022

(65) Prior Publication Data

US 2022/0254106 A1    Aug. 11, 2022

(30) Foreign Application Priority Data

Nov. 19, 2021   (CN) .......................... 202111376077.5

(51) Int. Cl.

| | |
|---|---|
| G06T 17/20 | (2006.01) |
| G06V 40/16 | (2022.01) |
| G06V 10/44 | (2022.01) |
| G06V 10/82 | (2022.01) |
| G06V 40/18 | (2022.01) |
| G06T 15/04 | (2011.01) |
| G06T 19/20 | (2011.01) |

(52) U.S. Cl.
CPC .............. *G06T 17/20* (2013.01); *G06T 15/04* (2013.01); *G06T 19/20* (2013.01); *G06V 10/454* (2022.01); *G06V 10/82* (2022.01); *G06V 40/168* (2022.01); *G06V 40/193* (2022.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 2017/0308992 | A1* | 10/2017 | Chalom | G06V 40/197 |
| 2019/0303722 | A1* | 10/2019 | Linden | G06T 7/74 |
| 2021/0182625 | A1* | 6/2021 | Arar | G06V 10/774 |
| 2022/0012472 | A1* | 1/2022 | Lee | G06T 7/70 |
| 2022/0058407 | A1* | 2/2022 | Yang | G06T 7/30 |

FOREIGN PATENT DOCUMENTS

WO    WO-2021169325 A1 *  9/2021 ........... G06K 9/0061

\* cited by examiner

*Primary Examiner* — Sultana M Zalalee (57) ABSTRACT

The present invention proposes method of gaze estimation with 3D face reconstructing, which precisely reconstructs a 3D face to accurately calculate the gaze direction of the face. The present invention decomposes the gaze direction calculation task into two sub-tasks of gaze-aligned 3D face reconstruction, and gaze contact realized by rotation. First, a 3D morphable model is used to reconstruct a basic 3D face with a 2D reference face image as input. Then, shape adjustment is performed on the basic 3D face to obtain a shape-aligned 3D reconstructed face. Finally, a gaze-aligned 3D face is obtained by replacing the textures of the shape-aligned 3D face eye area. For the subtask of gaze contact, the present invention proposes a novel method for realizing gaze contact by rotating a 3D face, which does not depend on too many assumptions and can be widely used in the field of virtual reality.

7 Claims, 5 Drawing Sheets

METHOD OF GAZE ESTIMATION WITH 3D FACE RECONSTRUCTING

CROSS-REFERENCE TO RELATED APPLICATION

The present application is based on, and claims priority from, Chinese application number CN202111376077.5, filed Nov. 19, 2021, the disclosure of which is hereby incorporated by reference herein in its entirety.

TECHNICAL FIELD

The present invention relates to the technical field of 3D face reconstruction and gaze estimation, which is a method of gaze estimation with 3D face reconstructing.

BACKGROUND OF THE INVENTION

For a long time, 3D face reconstruction has been the most popular research field in computer vision and computer imaging. A large number of existing works take single face image, multi-view image, video RGBD image and specific target image collection respectively as input to accomplish 3D face reconstruction. The present invention focuses on 3D face reconstruction that realizes gaze alignment using a 2D reference face image as input, which has wide applications in the field of gaze direction calculation and virtual reality. Gaze tracking technology, as a novel human-computer interaction method, is of great significance for understanding user behavior intentions. More than 80% of the information perceived by the brain is received by the visual system. Gaze-based interaction also requires less physical effort than gesture and voice interaction, and provides a more natural experience, having been actively explored in the field of virtual reality and human-computer interaction in recent years. The gaze direction calculation is the most direct way to achieve the final result. However, most of the existing gaze direction calculation technologies focus on directly outputting the gaze direction in 3D space with 2D face images as input. This, on the other hand, affects the generalization ability of the model, and on the other, the gaze direction in 3D space directly calculated from 2D photos as input will inevitably produce errors. The present invention proposes a new gaze calculation method directly applied to the 3D face, which, by rotating the gaze-aligned 3D face for gaze contact, completes the calculation of the 3D face in the gaze direction. In the process of completing gaze contact, the angle at which the 3D face rotates in the horizontal and vertical directions is the gaze direction of the 3D face in 3D space before rotation.

In the existing methods for completing 3D face reconstruction based on a single reference 2D face image, 3D morphable models play a crucial role. Based on the collected standard face data, 3D morphable models simplify the complex distribution of 3D faces in space into a linear combination of fixed face shapes. However, these methods usually require careful optimization to achieve high-quality 3D face reconstruction. With the rapid development of deep learning, convolutional neural networks are widely used in 3D face reconstruction. Tuan first uses convolutional neural networks to directly regress to 3D morphable model shape and texture parameters from input images. Dou further improves the accuracy of 3D face reconstruction by designing a multi-task loss function in an end-to-end training framework. For these CNN-based methods, one potential flaw is the lack of labeled data in the training stage, and another potential flaw is that they mainly focus on facial shape details such as wrinkles, while texture and shape accuracies of the eye area, as the most important interactive organs in virtual reality, are rarely considered. The present invention proposes a 3D face reconstruction method with accurate eye area, which first completes the reconstruction of the basic 3D face through a 3D morphable model, then performs shape alignment and texture alignment on the basic 3D face, and in the end completes the reconstruction of the 3D face that has aligned the gaze. The gaze direction of the gaze aligned 3D face reconstructed by the present invention is consistent with the gaze direction of the reference 2D face image, providing a basis for reconstructing the gaze direction and completing the gaze contact by rotating the 3D face.

In the early days, the realization of gaze contact depended on specific hardware, and the higher cost of custom hardware limited the application prospects of this type of method. An intuitive and direct method to complete the gaze contact is to complete the reconstruction of a 3D eyeball according to the input 2D reference face image based on a 3D eyeball model, and then control the texture and shape of the reconstructed 3D eyeball or directly rotate the eyeball to complete the gaze contact. Wherein, Banf uses the coordinates of the iris in the eye area for texture coordinate interpolation, which can achieve eye contact with a small angle offset. However, the interpolation only for the eye area will cause discontinuity in texture between the eye area and the face area, which affects the overall authenticity of the eye contact. Then, Gazedirector performs the gaze contact by rotating the reconstructed 3D eyeball. However, these 3D eye model-based methods rely on too many assumptions. This makes them ineffective in achieving the gaze contact in real-world applications. With the revolutionary progress of deep learning in computer vision, some methods use deep neural networks to accomplish the gaze contact. Ganin and et al. proposed a deep neural network (DNNs) to synthesize images of the eye area and complete the gaze contact by replacing pixels in the eye area. Limited by the performance of the generator, this method can only generate blurred eye area images. Subsequently, He and et al. adopted a generative adversarial network (GAN) to synthesize eye area images with high visual quality. However, limited by the distribution of the training dataset, this method can only achieve frontal eye contact. For examples with larger offset head poses, this method still cannot better synthesize real eye area images. In order to alleviate the impact of too little data on the performance of the model, Zhang and et al. proposed an unsupervised learning framework to train a generative adversarial network, which model can complete the gaze contact for various head poses of the input face. However, all existing methods focus on accomplishing the gaze contact by directly changing the texture or shape of the eye area, which has two major limitations: one is that the reconstructed eye area images are still of a relatively low visual quality, and the other is that the accuracy of the gaze contact is still relatively poor.

The present invention decomposes the gaze calculation task into two sub-tasks of gaze-aligned 3D face reconstruction, and gaze contact realized by rotation. To be specific, the present invention proposes a gaze aligned 3D face reconstruction module to ensure the accuracy and authenticity of the eye area of the reconstructed 3D face. First, a 3D morphable model is used to reconstruct a basic 3D face with a 2D reference face image as input. Then, shape adjustment is performed on the basic 3D face to obtain a shape-aligned 3D reconstructed face to ensure that the eye area of the 3D face is accurately aligned with the eye area of the input reference 2D face image. Finally, a gaze-aligned 3D face is obtained by replacing the textures of the shape-aligned 3D face eye area. For the subtask of gaze contact, the present invention proposes a novel method for realizing gaze contact by rotating a 3D face, which does not depend on too many assumptions and can be widely used in the field of virtual reality.

SUMMARY OF THE INVENTION

According to the above-mentioned actual needs and technical difficulties, the present invention provides a method of gaze estimation with 3D face reconstructing.

The present invention is achieved through the following steps:

Step 1, extract reconstruction coefficients from each reference 2D face image, and reconstruct a corresponding basic 3D face according to the 3D morphable model.

Let the RGB three channels of the reference 2D face photo be $I_i$, and input $I_i$ into the convolutional neural network (CNN) to extract the above-mentioned set of reconstruction coefficients W. The specific calculation method is as follows:

$$W=(W_s, W_e, W_t, \gamma, r, t),$$

Wherein, $W_s$ is used to control the shape of the basic 3D reconstructed face, $W_e$ is used to control the expression of the basic 3D face, $W_t$ is used to control the texture of the basic 3D face, $\gamma$ is used to control the illumination of the basic 3D face, r is used is used to control the rotation of the basic 3D face, and t is used to control the translation of the basic 3D face. The basic 3D reconstructed face $M_c$ can be obtained by inputting the reconstruction coefficients into the 3D morphable model. The specific calculation method is as follows:

$$M_c = F_{3DMM}(W), W = F_e(I_i),$$

Wherein, W is a set of reconstruction coefficients, $F_e$ is the above-mentioned convolutional neural network, $F_{3DMM}$ is the above-mentioned 3D morphable model, and $I_i$ is the RGB three channels of the reference 2D face photo.

Step 2, for each basic 3D reconstructed face, optimize the local area details to obtain a shape-aligned 3D reconstructed face;

Map the basic 3D reconstructed face $M_c$ to the 2D plane to obtain a basic 2D reconstructed face $I_c$, compare $I_c$ with $I_i$, design three loss functions to optimize the basic 3D reconstructed face $M_c$, and finally get the optimization result, which is a shape-aligned 3D reconstructed face $M_f$. The specific calculation method is as follows:

$$I_c = P(M_c)$$

$$L_{3D} = L_{photo}(I_i, I_c) + L_{landmarks}(I_i, I_c) + L_{reg}(W)$$

$$M_f = \arg \min_{M_c} L_{3D},$$

Wherein, argmin is the function taking the minimum value, $M_c$ is the basic 3D reconstructed face, $L_{3D}$ is the objective loss function in the optimization process, and the optimization of $M_c$ is completed through $L_{3D}$ minimization. When $M_c$ is optimized to $M_f$, the corresponding $L_{3D}$ is the smallest, P represents the mapping function from 3D to 2D, $I_c$ is the basic 2D reconstructed face, the photo loss $L_{photo}$ guarantees the consistency of appearance of the face by calculating the Euclidean distance between the reference 2D face photo and the basic 2D reconstructed face photo; the landmark loss $L_{landmarks}$ guarantees the consistency of the face contour and head pose by calculating the difference between the face landmarks extracted respectively from the 2D face photo and the basic 2D reconstructed face photo; and the regularization loss $L_{reg}$, by measuring the complexity of the model parameters, guarantees that the shape and texture of the reconstructed face will not be deformed.

Step 3, for each shape-aligned 3D reconstructed face, align its eye area texture with the reference 2D face image to obtain a gaze-aligned 3D reconstructed face;

Strictly align the projection of the eye area of the shape-aligned 3D reconstructed face $M_f$ on the 2D plane with the eye area of the reference 2D face photo, each point in the $M_f$ eye area corresponding to a certain pixel point in the eye area of the reference 2D face photo; by replacing the RGB value of each point in the $M_f$ eye area with the RGB value of the pixel point in the eye area of the corresponding 2D face photo, texture alignment of the two eye areas can be achieved to obtain a gaze-aligned 3D reconstructed face $M_o$.

Step 4, use the photos of the 3D reconstructed face at various rotation angles and design a specific gradient loss function to train a gaze contact discriminator;

The above-mentioned gaze contact discriminator $D_g$ is composed of a feature extractor and a gradient calculator. The feature extractor is used to acquire the visual features $d_s$ and $d_e$ before and after the rotation of $M_o$ obtained in step 3:

$$d_s = E_s(I_s), d_e = E_e(I_e),$$

Wherein, $I_s$ is the 2D reconstructed face photo mapped to the 2D plane before $M_o$ rotation, $I_e$ is the 2D reconstructed face photo mapped to the 2D plane after $M_o$ rotation, $E_s$ and $E_e$ are convolutional neural network modules, $d_s$ and $d_e$ are the corresponding visual features extracted, and then $d_s$ and $d_e$ are subjected to a differential operation, to be input by a gradient calculator $E_r$ composed of a series of residual modules, and finally complete the calculation of the gradient $g_{(s,e)}$ of the gaze direction of the gaze-aligned 3D reconstructed face $M_o$ after rotation, offset from the gaze contact direction:

$$g_{(s,e)} = E_r(d_e - d_s),$$

Design a specific gradient loss function $L_g$ to complete the training of the gaze contact discriminator $D_g$:

$$\hat{g}_{(s,e)} = D_g(I_S, I_e)$$

$$g_{(s,e)} = F_g(\angle A(e) - \angle A(s))$$

$$L_g = \|g_{(s,e)} - \hat{g}_{(s,e)}\|,$$

Wherein, $\|g_{(s,e)} - \hat{g}_{(s,e)}\|$ represents the norm of $g_{(s,e)} - \hat{g}_{(s,e)}$, $I_s$ is a 2D reconstructed face photo mapped to the 2D plane before $M_o$ rotation, $I_e$ a 2D reconstructed face photo mapped to the 2D plane after $M_o$ rotation, $F_g$ is a mapping function, responsible for mapping the angle error into the gradient, $\hat{g}(s,e)$ is the gradient directly estimated through $D_g$, $\angle A(s)$ is the angle of its gaze direction in 3D space before $M_o$ rotation, $\angle A(e)$ is the angle of its gaze direction in 3D space after $M_o$ rotation, the gradient loss function $L_g$ is optimized by the method of backpropagation and finally the optimization of $D_g$ is completed.

Step 5, for each gaze-aligned 3D reconstructed face waiting to achieve gaze contact, use the gaze contact discriminator to calculate the gradient of its gaze direction after rotation in each direction, offset from the gaze contact direction, design a specific rotation method, and rotate the 3D reconstructed face continuously until gaze contact is completed.

In the above 3D face rotation method, the specific steps of performing rotation are: randomly pre-rotate $M_o$ for M times, obtain the gradients $\{\hat{g}_{(s,e_1)}, \hat{g}_{(s,e_2)}, \ldots, \hat{g}_{(s,e_M)}\}$ in M directions, select the pre-rotation direction with the smallest gradient as the alternative rotation direction, the above process can be expressed by the formula:

$$c = \arg\min_i(\hat{g}_{(s,e_i)}),$$

Wherein, argmin is the function taking the minimum value, the gradient corresponding to the direction of the $c^{th}$ pre-rotation is the smallest. When $\hat{g}_{(s,e_c)}<0$, perform the first-step rotation, select the direction of the $c^{th}$ pre-rotation as the first rotation direction, set $s=e_c$, and after multiple rotations, if the gradient values of all directions in $\{\hat{g}_{(s,e_1)}, \hat{g}_{(s,e_2)}, \ldots, \hat{g}_{(s,e_M)}\}$ are greater than 0, terminate the rotation, and $M_o$ at the time completes the gaze contact through continuous rotations.

DETAILED DESCRIPTION OF THE INVENTION

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be further noted that, for ease of description, only the portions related to the relevant invention are shown in the drawings. In the case of no conflict, the embodiments in the present disclosure and the features in the embodiments can be combined with each other.

It should be noted that such concepts as "first" and "second" mentioned in the present disclosure are only used to distinguish different devices, modules or units, not to limit the order of functions performed by these devices, modules or units, or the interdependence therebetween.

It should be noted that such adjuncts as "one" and "more" mentioned in the present disclosure are illustrative, not restrictive, and those skilled in the art should understand that, unless the context clearly indicates otherwise, they should be understood as "one or more".

The names of messages or information exchanged between multiple devices in the embodiments of the present disclosure are only for illustrative purposes, and are not intended to limit the scope of these messages or information. The specific embodiments of the present invention will be described in further detail below with reference to the accompanying drawings and specific embodiments. The following examples or drawings are used to illustrate the present invention, but not to limit the scope of the present invention.

Figure 1:
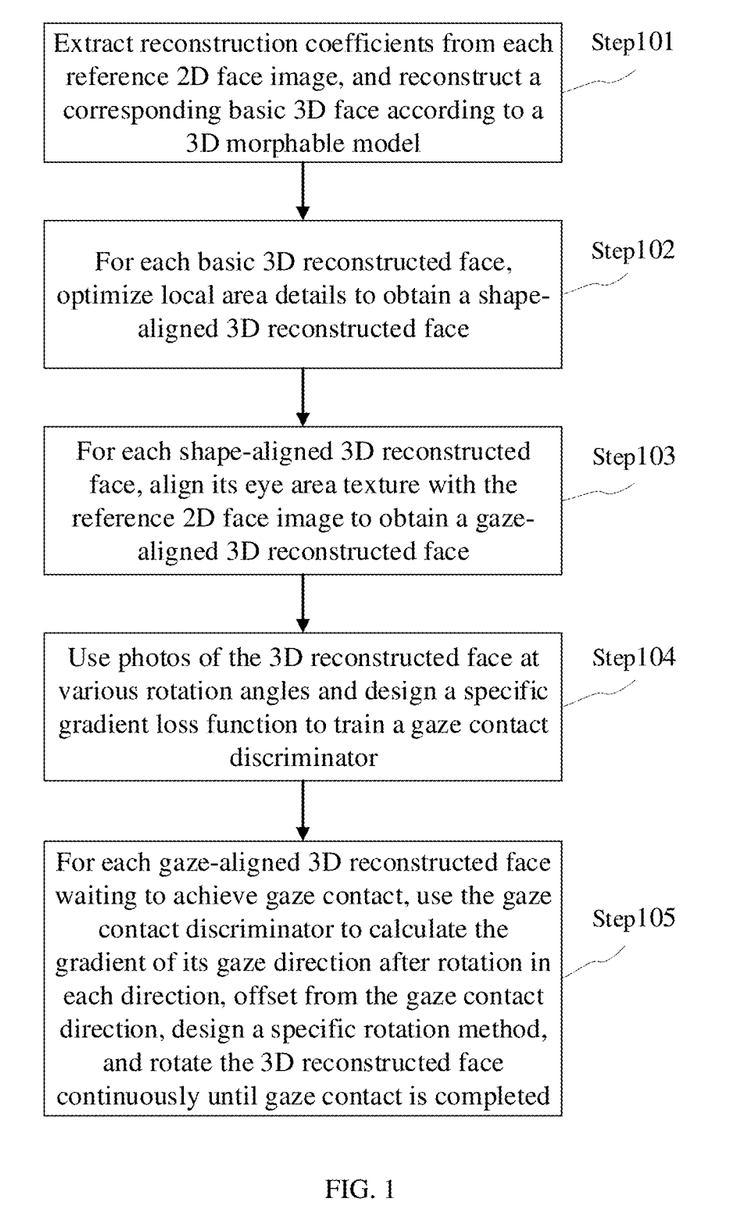
FIG. 1 is a flow chart of the method of gaze estimation with 3D face reconstructing of the present invention.

FIG. 1 is a flow chart of the method of gaze estimation with 3D face reconstructing of the present invention, comprising the following steps:

Step 101: Extract reconstruction coefficients from each reference 2D face image, and reconstruct a corresponding basic 3D face according to the 3D morphable model;

Step 102: For each basic 3D reconstructed face, optimize the local area details to obtain a shape-aligned 3D reconstructed face;

Step 103: For each shape-aligned 3D reconstructed face, align its eye area texture with the reference 2D face image to obtain a gaze-aligned 3D reconstructed face;

Step 104: Use the photos of the 3D reconstructed face at various rotation angles and design a specific gradient loss function to train a gaze contact discriminator;

Step 105: For each gaze-aligned 3D reconstructed face waiting to achieve gaze contact, use the gaze contact discriminator to calculate the gradient of its gaze direction after rotation in each direction, offset from the gaze contact direction, design a specific rotation method, and rotate the 3D reconstructed face continuously until gaze contact is completed.

Figure 2:
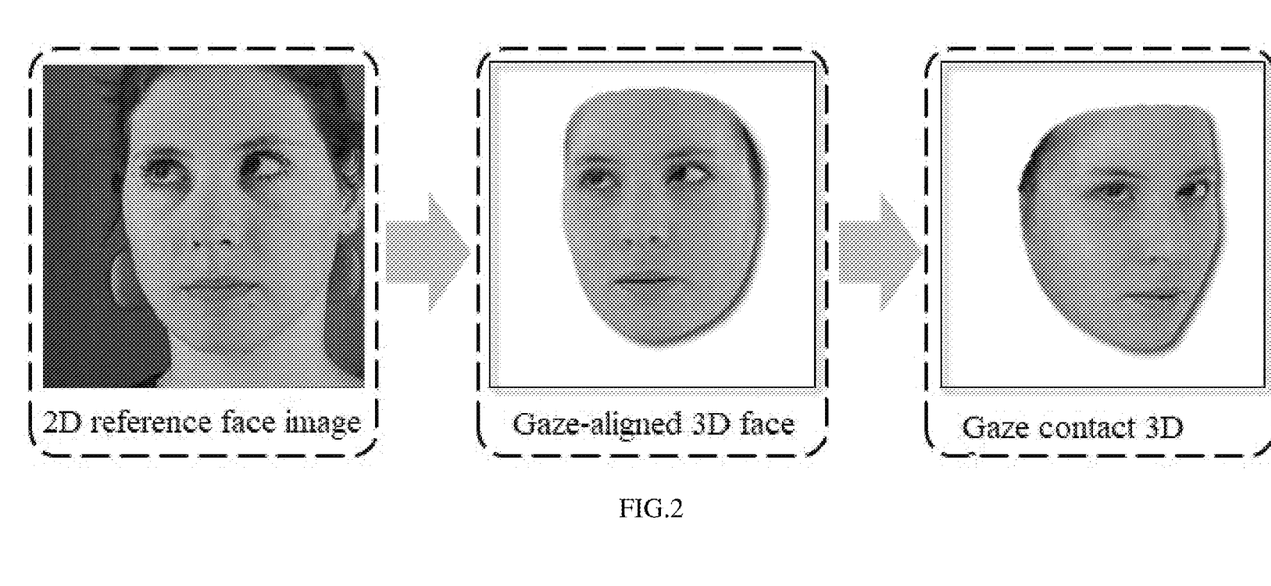
FIG. 2 is an overall flow chart of the gaze contact of the method of gaze estimation with 3D face reconstructing of the present invention.

FIG. 2 is a flow chart of realizing gaze contact in 3D space with a 2D reference face image as input. First, complete the reconstruction of a gaze-aligned 3D face for the 2D reference face image, and then complete the gaze contact of the 3D face through a preset rotation method.

Figure 3:
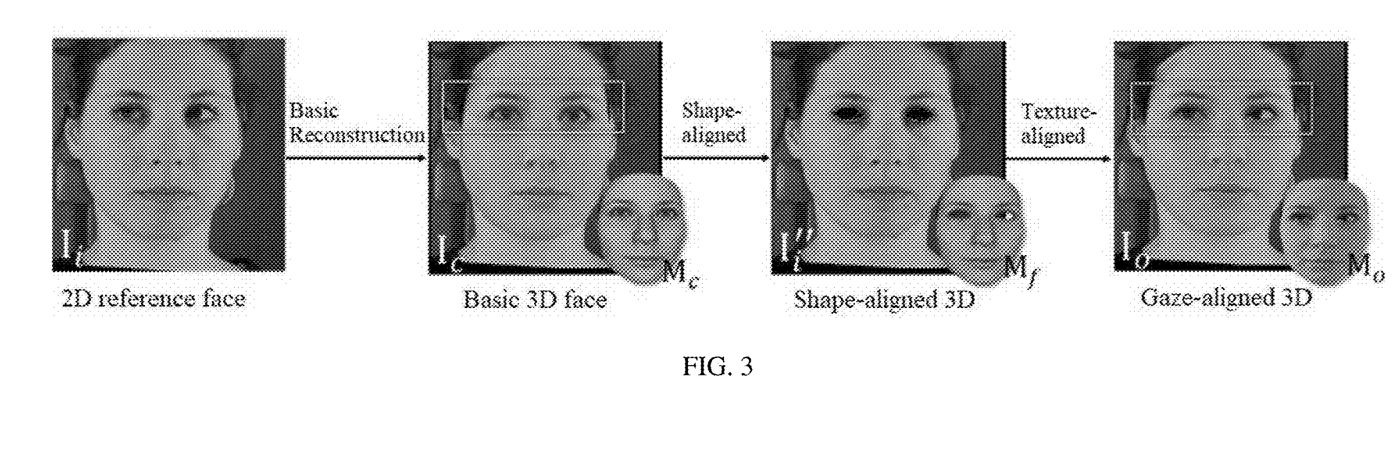
FIG. 3 is a flow chart of the gaze-aligned 3D face reconstruction of the method of gaze estimation with 3D face reconstructing of the present invention.

As shown in FIG. 3, let the RGB three channels of the reference 2D face photo be $I_t$, and input $I_t$ into the convolutional neural network (CNN) to extract the above-mentioned set of reconstruction coefficients W. The specific calculation method is as follows:

$$W=(W_s, W_e, W_t, \gamma, r, t),$$

Wherein, $W_s$ is used to control the shape of the basic 3D reconstructed face, $W_e$ is used to control the expression of the basic 3D face, $W_t$ is used to control the texture of the basic 3D face, $\gamma$ is used to control the illumination of the basic 3D face, r is used is used to control the rotation of the basic 3D face, and t is used to control the translation of the basic 3D face. The basic 3D reconstructed face $M_c$ can be obtained by inputting the reconstruction coefficients into the 3D morphable model. The specific calculation method is as follows:

$$M_c=F_{3DMM}(W), W=F_e(I_t),$$

Wherein, W is a set of reconstruction coefficients, $F_e$ is the above-mentioned convolutional neural network, and $F_{3DMM}$ is the above-mentioned 3D morphable model Map the basic 3D reconstructed face $M_c$ to the 2D plane to obtain a basic 2D reconstructed face $I_c$, compare $I_c$ with $I_t$, design three loss functions to optimize the basic 3D reconstructed face $M_c$, and finally get the optimization result, which is a shape-aligned 3D reconstructed face $M_f$. The specific calculation method is as follows:

$$I_c = P(M_c)$$

$$L_{3D} = L_{photo}(I_i, I_c) + L_{landmarks}(I_i, I_c) + L_{reg}(W)$$

$$M_f = \arg \min_{M_c} L_{3D},$$

Wherein, argmin is the function taking the minimum value, $M_c$ is the basic 3D reconstructed face, $L_{3D}$ is the objective loss function in the optimization process, and the optimization of $M_c$ is completed through $L_{3D}$ minimization. When $M_c$ is optimized to $M_f$, the corresponding $L_{3D}$ is the smallest, P represents the mapping function from 3D to 2D, $I_c$ is the basic 2D reconstructed face, the photo loss $L_{photo}$ guarantees the consistency of appearance of the face by calculating the Euclidean distance between the reference 2D face photo and the basic 2D reconstructed face photo; the landmark loss $L_{landmarks}$ guarantees the consistency of the face contour and head pose by calculating the difference between the face landmarks extracted respectively from the 2D face photo and the basic 2D reconstructed face photo; and the regularization loss $L_{reg}$, by measuring the complexity of the model parameters, guarantees that the shape and texture of the reconstructed face will not be deformed.

For the above-mentioned shape-aligned 3D reconstructed face $M_f$, the projection of its eye area on the 2D plane is strictly aligned with the eye area of the reference 2D face photo, each point in the $M_f$ eye area corresponding to a certain pixel point in the eye area of the reference 2D face photo; by replacing the RGB value of each point in the $M_f$ eye area with the RGB value of the pixel point in the eye area of the corresponding 2D face photo, texture alignment of the two eye areas can be achieved to obtain a gaze-aligned 3D reconstructed face $M_o$.

Figure 4:
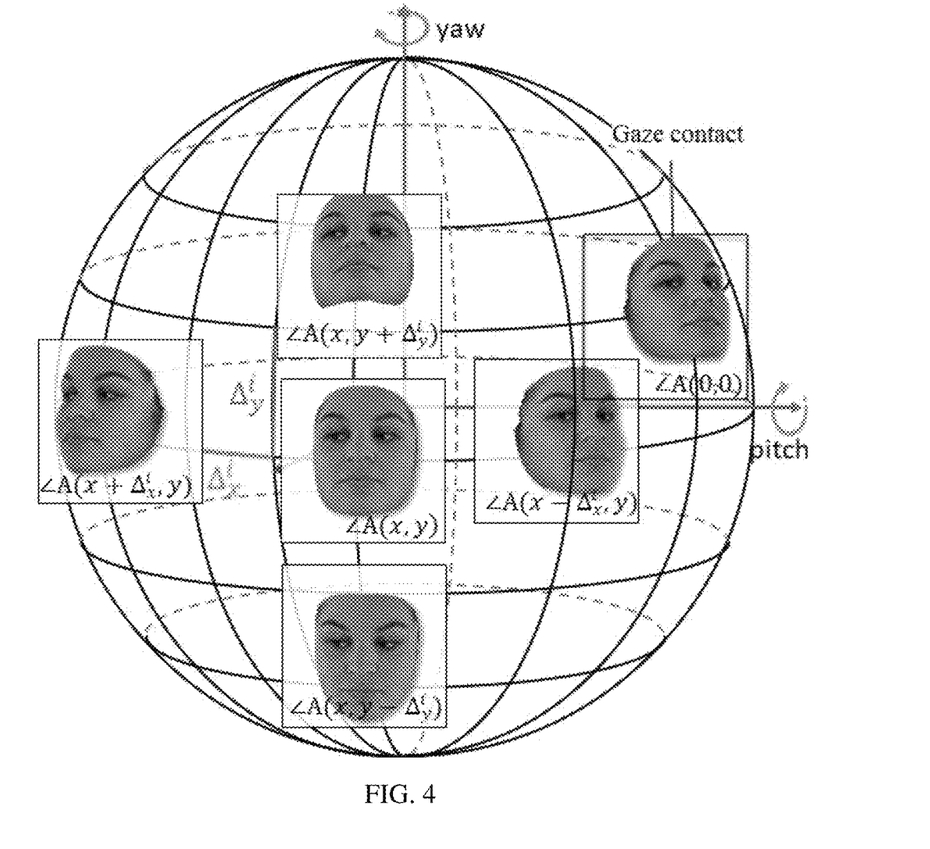
FIG. 4 is a distribution diagram of the gaze contact discriminator training data of the method of gaze estimation with 3D face reconstructing of the present invention.

As shown in FIG. 4, a dataset for training the gaze contact discriminator $D_g$ is constructed by continuously rotating the gaze-aligned 3D reconstructed face $M_o$ and collecting the corresponding 2D reconstructed face photo after each rotation. To be specific, let the angle of the horizontal and vertical offset of the gaze direction of the gaze-aligned 3D reconstructed face $M_o$ in 3D space before rotation be $\angle A(x, y)$, the 2D reconstructed face photo mapped on the 2D plane be $I_{(x,y)}$; the gaze direction of $M_o$ after the $i^{th}$ rotation is $\angle A(x+\Delta_x^i, y+\Delta_y^i)$, wherein, $\Delta_x^i$ is the angle at which $M_o$ rotates in the horizontal direction, and $\Delta_y^i$ is the angle at which $M_o$ rotates in the vertical direction. The 2D reconstructed face image mapped on the 2D plane is $I_{(x+\Delta_x^i, y+\Delta_y^i)}$, and after N rotations, for a gaze-aligned 3D reconstructed face $M_o$, the dataset $\{(I_{(x+\Delta_x^1, y+\Delta_y^1)}, I_{(x+\Delta_x^2, y+\Delta_y^2)}, I_{(x+\Delta_x^3, y+\Delta_y^3)}, \ldots, I_{(x+\Delta_x^N, y+\Delta_y^N)}\}$ with a total number of N can be constructed. When $\Delta_x^i = -x$, $\Delta_y^i = -y$, $M_o$ completes gaze contact after the $i^{th}$ rotation, and the angular offset corresponding to the constructed 2D reconstructed face photo dataset, relative to the gaze contact direction in 3D space is $\{\angle A(x+\Delta_x^1, y+\Delta_y^1), \angle A(x+\Delta_x^2, y+\Delta_y^2), \ldots, \angle A(x+\Delta_x^N, y+\Delta_y^N)\}$.

Figure 5:
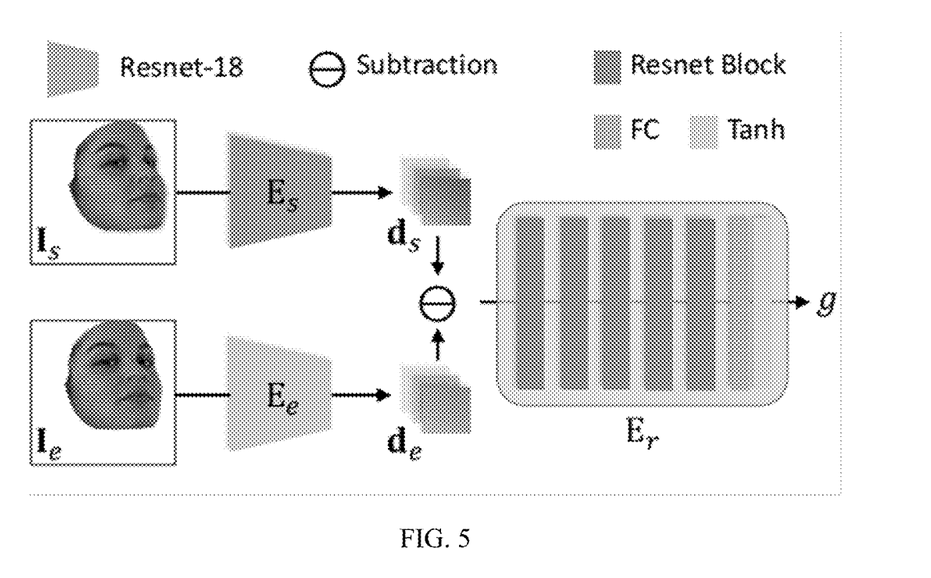
FIG. 5 is a structural diagram of the gaze contact discriminator of the method of gaze estimation with 3D face reconstructing of the present invention.

As shown in FIG. 5, the above-mentioned gaze contact discriminator $D_g$ is composed of a feature extractor and a gradient calculator, wherein the feature extractor is composed of two convolutional neural network (CNNs) modules, takes as input the 2D face photos mapped to the 2D plane respectively before and after the rotation of the gaze-aligned 3D reconstructed face $M_o$, and extracts the corresponding visual features $d_s$ and $d_e$:

$$d_s = E_s(I_s), d_e = E_e(I_e),$$

Wherein, $I_s$ is the 2D reconstructed face photo mapped to the 2D plane before $M_o$ rotation, $I_e$ is the 2D reconstructed face photo mapped to the 2D plane after $M_o$ rotation, $E_s$ and $E_e$ are the above-mentioned convolutional neural network module Resnet-18, $d_s$ and $d_e$ are the extracted corresponding visual features, and then $d_s$ and $d_e$ are subjected to a differential operation Subtraction as the input of the gradient calculator $E_r$ composed of a series of residual modules Resnet Block, wherein, the above gradient calculator $E_r$ includes residual modules Resnet Block, fully connected layer FC and activation function Tanh, and in the end completes the calculation of the gradient $g_{(s,e)}$ of the gaze direction after rotation of the gaze-aligned 3D reconstructed face M, offset from the gaze contact direction$_o$:

$$g(s,e) = E_r(d_e - d_s),$$

According to the specific network structure, data and distribution of the gaze contact discriminator, a specific gradient loss function $L_g$ is designed to complete the training of the gaze contact discriminator $D_g$:

$$\hat{g}_{((x+\Delta_x^i, y+\Delta_y^i),(x+\Delta_x^j, y+\Delta_y^j))} = D_g(I_{(x+\Delta_x^i, y+\Delta_y^i)}, I_{(x+\Delta_x^j, y+\Delta_y^j)})$$

$$g_{((x+\Delta_x^i, y+\Delta_y^i),(x+\Delta_x^j, y+\Delta_y^j))} = F_g(\angle A(x+\Delta_x^j, y+\Delta_y^j) - \angle A(x+\Delta_x^i, y+\Delta_y^i))$$

$$L_g = \|g_{(x+\Delta_x^i, y+\Delta_y^i, x+\Delta_x^j, y+\Delta_y^j)} - \hat{g}_{(x+\Delta_x^i, y+\Delta_y^i, x+\Delta_x^j, y+\Delta_y^j)}\|,$$

Wherein, $\|g_{(x+\Delta_x^i, y+\Delta_y^i, x+\Delta_x^j, y+\Delta_y^j)} - \hat{g}_{(x+\Delta_x^i, y+\Delta_y^i, x+\Delta_x^j, y+\Delta_y^j)}\|$ represents the norm of $g_{(x+\Delta_x^i, y+\Delta_y^i, x+\Delta_x^j, y+\Delta_y^j)} - \hat{g}_{(x+\Delta_x^i, y+\Delta_y^i, x+\Delta_x^j, y+\Delta_y^j)}$, $F_g$ is a mapping function, which is responsible for mapping an angle error into a gradient, and the gradient loss function $L_g$ is optimized by backpropagation to complete the training of the gaze contact discriminator $D_g$.

In 3D face rotation method, 3D face rotation is divided into three stages, i.e., start rotation, continuous rotation and end rotation, specifically:

The specific step of the first rotation is: randomly pre-rotate M times the gaze-aligned 3D reconstructed face $M_o$, obtain the gradients $\{\hat{g}_{((x,y),(x+\Delta_x^1, y+\Delta_y^1))}, \hat{g}_{((x,y),(x+\Delta_x^2, y+\Delta_y^2))}, \ldots, \hat{g}_{((x,y),(x+\Delta_x^M, y+\Delta_y^M))}\}$ in M directions, and select the pre-rotation direction with the smallest gradient as the alternative rotation direction:

$$c = \arg \min_i \left( \hat{g}_{((x,y),(x+\Delta_x^i, y+\Delta_y^i))} \right),$$

Wherein, argmin is the function taking the minimum value, the gradient corresponding to the direction of the $c^{th}$ pre-rotation is the smallest. When $\hat{g}_{((x,y),(x+\Delta_x^i, y+\Delta_y^i))} < 0$, the first rotation is performed, and the direction of the $c^{th}$ pre-rotation is selected as the first rotation direction. Let $\tilde{x} = x + \Delta_x^i$, $\tilde{y} = y + \Delta_y^i$. $(\tilde{x}, \tilde{y})$ is the offset of the gaze direction of the 3D reconstructed face in 3D space, relative to the horizontal and vertical directions, before the next rotation starts.

The specific step of the $i^{th}$ rotation is to randomly perform M pre-rotations of $M_o$ with an offset $(\tilde{x}, \tilde{y})$ of the gaze direction relative to the horizontal and vertical directions in the 3D space, and obtain the gradients in M directions as follows:

$$\{\hat{g}_{((\tilde{x},\tilde{y}),(\tilde{x}+\Delta_x^1, \tilde{y}+\Delta_y^1))}, \hat{g}_{((\tilde{x},\tilde{y}),(\tilde{x}+\Delta_x^2, \tilde{y}+\Delta_y^2))}, \ldots, \hat{g}_{((\tilde{x},\tilde{y}),(\tilde{x}+\Delta_x^M, \tilde{y}+\Delta_y^M))}\}.$$

The pre-rotation direction with the smallest gradient is selected as the alternative rotation direction, and the specific calculation method is as follows:

$$c = \arg\min_i \left( \hat{g}_{((\tilde{x},\tilde{y}),(\tilde{x}+\Delta_x^i,\tilde{y}+\Delta_y^i))} \right),$$

Wherein, argmin is the function taking the minimum value, and the gradient corresponding to the direction of the $c^{th}$ pre-rotation is the smallest. When $\hat{g}_{((\tilde{x},\tilde{y}),(\tilde{x}+\Delta_x^i,\tilde{y}+\Delta_y^i))} < 0$, the $i^{th}$ step of rotation is performed, and the direction of the $c^{th}$ pre-rotation is selected as the rotation direction of the $i^{th}$ step, and $\tilde{x}=\tilde{x}+\Delta_x^i$, $\tilde{y}=\tilde{y}+\Delta_y^i$ is updated.

When the gradients of $M_o$ rotation in all directions are greater than 0, terminate the rotation. At the time, $M_o$ completes the gaze contact through continuous rotations.

The above description is only some preferred embodiments of the present disclosure and an explanation of the applied technical principles. Those skilled in the art should understand that the scope of invention involved in the embodiments of the present disclosure is not limited to the technical solutions formed by the specific combination of the above technical features, and at the same time, shall also cover other technical solutions formed by any combinations of the above technical features or their equivalent features in the case of not departing from the above-mentioned inventive concept, for example, technical solutions formed by replacing the above features with the technical features of similar functions disclosed in (but not limited to) the embodiments of the present disclosure.

What is claimed is:

1. A method of gaze estimation with 3D face reconstructing, comprising:
   step 1, extracting reconstruction coefficients from each reference 2D face image, and reconstructing a corresponding basic 3D face according to a 3D morphable model;
   step 2, for each basic 3D reconstructed face, optimizing local area details to obtain a shape-aligned 3D reconstructed face;
   step 3, for each shape-aligned 3D reconstructed face, aligning its eye area texture with the reference 2D face image to obtain a gaze-aligned 3D reconstructed face;
   step 4, using photos of the 3D reconstructed face at various rotation angles and designing a specific gradient loss function to train a gaze contact discriminator;
   step 5, for each gaze-aligned 3D reconstructed face waiting to achieve gaze contact, using the gaze contact discriminator to calculate a gradient of its gaze direction after rotation in each direction, offset from a gaze contact direction, designing a specific rotation method, and rotating the 3D reconstructed face continuously until the gaze contact is completed.

2. The method of claim 1, wherein, the extracting reconstruction coefficients from each reference 2D face image and reconstructing a corresponding basic 3D face according to a 3D morphable model, comprises:
   using the 3D morphable model as a reconstruction model, and using the reconstruction coefficients extracted by a convolutional neural network as an input of the 3D morphable model to complete the reconstructing of the basic 3D face $M_c$.

3. The method of claim 1, wherein, in a method of constructing the shape-aligned 3D reconstructed face $M_f$, step 2 designs a loss function by comparing the basic 3D face with a reference 2D face image, to complete the optimizing of the local area details for the basic 3D face.

4. The method of claim 1, wherein, in a method of constructing the gaze-aligned 3D reconstructed face $M_o$, a projection of the eye area of the $M_f$ obtained in step 2 on a 2D plane is strictly aligned with the eye area of a reference 2D face photo, each point in the $M_f$ eye area corresponding to a certain pixel in the eye area of the reference 2D face photo, and step 3, by completely replacing a texture of the $M_f$ eye area with a texture in the eye area of the 2D face photo, can accomplish texture alignment of both eye areas.

5. The method of claim 1, wherein, the gaze contact discriminator $D_g$ is composed of a feature extractor and a gradient calculator, the feature extractor being used to acquire visual features $d_s$ and $d_e$ before and after rotation of $M_o$ obtained in step 3:

$$d_s = E_s(I_s),\ d_e = E_e(I_e),$$

wherein, $I_s$ is the 2D reconstructed face photo mapped to the 2D plane before $M_o$ rotation, $I_e$ is the 2D reconstructed face photo mapped to the 2D plane after $M_o$ rotation, $E_s$ and $E_e$ are convolutional neural network modules, $d_s$ and $d_e$ are corresponding visual features extracted, then $d_s$ and $d_e$ are subjected to a differential operation, to be input by the gradient calculator $E_r$ composed of a series of residual modules, and finally complete a calculation of the gradient $g_{(s,e)}$ of the gaze direction of the gaze-aligned 3D reconstructed face $M_o$ after rotation, offset from the gaze contact direction:

$$g_{(s,e)} = E_r(d_e - d_s),$$

Wherein, $E_r$ is the gradient calculator, $d_s$ and $d_e$ are the corresponding visual features extracted.

6. The method of claim 1, wherein, the using photos of the 3D reconstructed face at various rotation angles and designing a specific gradient loss function to train a gaze contact discriminator, comprises:
   designing the specific gradient loss function $L_g$ to complete the training of the gaze contact discriminator $D_g$:

$$\hat{g}_{(s,e)} = D_g(I_S, I_e)$$

$$g_{(s,e)} = F_g(\angle A(e) - \angle A(s))$$

$$L_g = \|g_{(s,e)} - \hat{g}_{(s,e)}\|,$$

wherein, $\|g_{(s,e)} - \hat{g}_{(s,e)}\|$ represents a norm of $g_{(s,e)} - \hat{g}_{(s,e)}$, $I_S$ is a 2D reconstructed face photo mapped to the 2D plane before $M_o$ rotation, $I_e$ a 2D reconstructed face photo mapped to the 2D plane after $M_o$ rotation, $F_g$ is a mapping function, responsible for mapping an angle error into the gradient, $\hat{g}_{(s,e)}$ is the gradient directly estimated through $D_g$, $\angle A(s)$ is an angle of its gaze direction in 3D space before $M_o$ rotation, $\angle A(e)$ is an angle of its gaze direction in 3D space after $M_o$ rotation, the gradient loss function $L_g$ is optimized by a method of backpropagation and finally an optimization of $D_g$ is completed.

7. The method of claim 1, wherein, the for each gaze-aligned 3D reconstructed face waiting to achieve gaze contact, using the gaze contact discriminator to calculate the gradient of its gaze direction after rotation in each direction, offset from the gaze contact direction, designing a specific rotation method, and rotating the 3D reconstructed face continuously until the gaze contact is completed, comprises:
   randomly pre-rotating $M_o$ for M times, obtaining gradients $\{\hat{g}_{(s,e_1)}, \hat{g}_{(s,e_2)}, \ldots, \hat{g}_{(s,e_M)}\}$ in M directions, selecting a pre-rotation direction with a smallest gradient as an alternative rotation direction, the above process can be expressed by the formula:

$$c = \arg\min_{i}(\hat{g}_{(s,e_i)}),$$

wherein, argmin is a function taking a minimum value, a gradient corresponding to a direction of a $c^{th}$ pre-rotation is the smallest; when $\hat{g}_{(s,e_i)}<0$, perform a first-step rotation, select the direction of the $c^{th}$ pre-rotation as a first rotation direction, set $s=e_c$, and after multiple rotations, if gradient values of all directions in $\{\hat{g}_{(s,e_1)}, \hat{g}_{(s,e_2)}, \ldots, \hat{g}_{(s,e_M)}\}$ are greater than 0, terminate the rotation, and $M_o$ at the time completes the gaze contact through continuous rotations.

* * * * *